United States Patent
Tung

(10) Patent No.: US 9,552,112 B2
(45) Date of Patent: Jan. 24, 2017

(54) CAPACITIVE TOUCH DISPLAY PANEL, CAPACITIVE TOUCH PANEL AND MANUFACTURING METHOD THEREOF

(71) Applicant: Au Optronics Corporation, Hsinchu (TW)

(72) Inventor: Teng-Fu Tung, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 28 days.

(21) Appl. No.: 14/247,262

(22) Filed: Apr. 8, 2014

(65) Prior Publication Data

US 2015/0169105 A1 Jun. 18, 2015

(30) Foreign Application Priority Data

Dec. 17, 2013 (TW) .............................. 102146714 A

(51) Int. Cl.
*G06F 3/044* (2006.01)
*G06F 3/045* (2006.01)

(52) U.S. Cl.
CPC ..... *G06F 3/044* (2013.01); *G06F 2203/04103* (2013.01); *G06F 2203/04111* (2013.01)

(58) Field of Classification Search
CPC ..... G06F 3/044; H03K 17/962; H03K 17/955; H03K 17/9645; G01D 5/24
See application file for complete search history.

(56) References Cited

U.S. PATENT DOCUMENTS

| 8,581,880 | B2 | 11/2013 | Kuo | |
|---|---|---|---|---|
| 2009/0309850 | A1* | 12/2009 | Yang | G06F 3/044 345/174 |
| 2010/0149117 | A1* | 6/2010 | Chien | G06F 3/0412 345/173 |
| 2011/0157086 | A1* | 6/2011 | Ozeki | G06F 3/044 345/174 |
| 2011/0193793 | A1* | 8/2011 | An | G06F 3/044 345/173 |

(Continued)

FOREIGN PATENT DOCUMENTS

| CN | 102087566 | 6/2011 |
|---|---|---|
| TW | 201000966 | 1/2010 |

(Continued)

*Primary Examiner* — Kent Chang
*Assistant Examiner* — William Lu
(74) *Attorney, Agent, or Firm* — Jianq Chyun IP Office

(57) ABSTRACT

A capacitive touch display panel including a display panel and a capacitive touch device is provided. The capacitive touch device is disposed on a display surface of the display panel. The capacitive touch device includes at least one opaque bridge line and at least one low reflection pattern layer. The opaque bridge line has a first linewidth and two first main borders. The low reflection pattern layer is disposed on a side of the opaque bridge that is opposite to the display panel. The low reflection pattern layer has a second linewidth and two second main borders. The low reflection pattern layer overlaps the opaque bridge line in a vertical projection direction. The first line width is substantially equal to the second line width, and the first main borders are substantial aligned to the second main borders. A capacitive touch panel and a manufacturing method thereof are provided, too.

20 Claims, 10 Drawing Sheets

(56) References Cited

U.S. PATENT DOCUMENTS

| | | | | |
|---|---|---|---|---|
| 2011/0254804 | A1* | 10/2011 | Kuo | G06F 3/0418 345/174 |
| 2012/0032907 | A1* | 2/2012 | Koizumi | G06F 3/0488 345/173 |
| 2012/0075214 | A1* | 3/2012 | Kim | G06F 3/041 345/173 |
| 2012/0098762 | A1* | 4/2012 | Kim | G06F 3/044 345/173 |
| 2012/0169647 | A1* | 7/2012 | Kuo | G06F 3/044 345/174 |
| 2012/0182230 | A1* | 7/2012 | Wang | G06F 3/044 345/173 |
| 2012/0262385 | A1* | 10/2012 | Kim | G06F 3/044 345/173 |
| 2013/0043068 | A1* | 2/2013 | Xie | G06F 3/044 174/262 |
| 2014/0320761 | A1* | 10/2014 | Misaki | G06F 3/041 349/12 |

FOREIGN PATENT DOCUMENTS

| | | |
|---|---|---|
| TW | 201022761 | 6/2010 |
| TW | 201211624 | 3/2012 |
| TW | 201227474 | 7/2012 |
| TW | I374299 | 10/2012 |

* cited by examiner

CAPACITIVE TOUCH DISPLAY PANEL, CAPACITIVE TOUCH PANEL AND MANUFACTURING METHOD THEREOF

CROSS-REFERENCE TO RELATED APPLICATION

This application claims the priority benefit of Taiwan application serial no. 102146714, filed on Dec. 17, 2013. The entirety of the above-mentioned patent application is hereby incorporated by reference herein and made a part of this specification.

BACKGROUND

Field of the Application

The invention relates to a touch display panel, a touch panel and a manufacturing method thereof, and more particularly, to a capacitive touch display panel, a capacitive touch panel and a manufacturing method thereof.

Description of Related Art

Touch panels are roughly grouped into resistive touch panels, capacitive touch panels, optical touch panels, acoustic wave touch panels and electromagnetic touch panels according to different sensing methods thereof. The capacitive touch panels having advantages of fast response speed, favorable reliability, and durability have been extensively in electronic devices.

In general, the capacitive touch panel includes a plurality of first sensing series extending along a first direction and a plurality of second sensing series extending along a second direction. Wherein, each of the first sensing series is formed by connecting a plurality first sensing pads and first bridge lines in series, and each of the second sensing series is formed by connecting a plurality of second sensing pads and second bridge lines in series. Metal having advantages of favorable conductivity and low impedance is a commonly used material of the bridge lines. However, since the metal has greater reflectivity, it is likely to reflect ambient light and generate bright spots or bright lines, and thus a user is very easy to see bright spots or bright lines at whereby the bridge lines are located, thereby influencing the user's visual experience and lowering the user's willingness to use. Therefore, how to accurately reducing bright spots or bright lines at whereby the bridge lines are located without lowering a display aperture ratio around the bridge lines has become a prominent task for the industries.

SUMMARY OF THE APPLICATION

The invention provides a capacitive touch display panel for improving the problem in which the conventional metal bridge line is easily being seen by user.

The invention provides a capacitive touch panel for improving the problem in which the conventional metal bridge line is easily being seen by user.

The invention provides a manufacturing method of capacitive touch panel, and the manufactured capacitive touch panel may improve the problem in which the conventional metal bridge line is easily being seen by user.

A capacitive touch display panel of the invention includes a display panel and a capacitive touch device. The display panel has a display surface. The capacitive touch device is disposed on the display surface of the display panel. The capacitive touch device includes at least one opaque bridge line, at least one low reflection pattern layer, a plurality of first transparent electrodes, a plurality of second transparent electrodes, at least one transparent bridge line and an insulating pattern layer. The at least one opaque bridge line is disposed on the display surface of the display panel, the opaque bridge line has a first linewidth, and two sides of the opaque bridge line have two first main borders. The at least one low reflection pattern layer is disposed on a side of the display panel that is opposite to the opaque bridge line. The low reflection pattern layer has a second linewidth, and two sides of the low reflection pattern layer have two second main borders, wherein the low reflection pattern layer overlaps with the opaque bridge line in a vertical projection direction, the first linewidth is substantially equal to the second linewidth, and the first main borders is substantially aligned to the second main borders.

The first transparent electrodes are disposed on the display surface of the display panel along a first direction, and the opaque bridge line is partially overlapped with the two adjacent first transparent electrodes so that the opaque bridge line is electrically connected with the two adjacent first transparent electrodes. The second transparent electrodes are disposed on the display surface of the display panel along a second direction. The at least one transparent bridge line is disposed on the display surface of the display panel and enables the two adjacent second transparent electrodes to be electrically connected. The insulating pattern layer is disposed between the opaque bridge line and the transparent bridge line to electrically isolate the opaque bridge line from the transparent bridge line.

In one embodiment of the invention, the capacitive touch panel further includes a polarizer disposed on the display surface of the display panel and covering the capacitive touch device.

In one embodiment of the invention, the capacitive touch panel further includes an optical adhesive layer disposed on a surface of the polarizer that faces toward the display surface.

In one embodiment of the invention, the capacitive touch panel further includes a protective plate disposed on the display surface of the display panel and covering the capacitive touch device.

In one embodiment of the invention, the capacitive touch display panel further includes an optical adhesive layer disposed on a surface of the protective plate that faces toward the display surface.

In one embodiment of the invention, a material of the opaque bridge line is metal.

In one embodiment of the invention, the low reflection pattern layer includes a black resin layer, a low reflective metal layer or a low reflective metal oxide layer.

In one embodiment of the invention, the first linewidth is less than or equal to 30 μm.

In one embodiment of the invention, two ends of the opaque bridge line have two first sub borders, two ends of the low reflection pattern layer have two second sub borders, and the first sub borders are substantially aligned to the second sub borders.

In one embodiment of the invention, two ends of the opaque bridge line have two first sub borders, and the low reflection pattern layer exposes the first sub borders of the opaque bridge line.

A capacitive touch panel of the invention includes a substrate and a capacitive touch device. The substrate has an outer surface. The capacitive touch device is disposed on the outer surface of the substrate. The capacitive touch device includes at least one opaque bridge line, at least one low reflection pattern layer, a plurality of first transparent electrodes, a plurality of second transparent electrodes, at least one transparent bridge line and an insulating pattern layer. The at least one opaque bridge line is disposed on the outer surface of the substrate. The opaque bridge line has a first linewidth, and two sides of the opaque bridge line have two first main borders. The at least one low reflection pattern layer is disposed on a side of the opaque bridge line that is opposite to the substrate. The low reflection pattern layer has a second linewidth, and two sides of the low reflection pattern layer have two second main borders. Wherein, the low reflection pattern layer overlaps with the opaque bridge line on a vertical projection direction, the first linewidth is substantially equal to the second linewidth, and the first main borders is substantially aligned to the second main borders.

The first transparent electrodes is disposed on the outer surface of the substrate along a first direction, and the opaque bridge line is partially overlapped with the two adjacent first transparent electrodes so that the opaque bridge line is electrically connected with the two adjacent first transparent electrodes. The second transparent electrodes are disposed on the outer surface of the substrate along a second direction. The at least one transparent bridge line is disposed on the outer surface of the substrate and electrically connects the two adjacent second transparent electrodes. The insulating pattern layer is disposed between the opaque bridge line and the transparent bridge line to electrically isolate the opaque bridge line from the transparent bridge line.

In one embodiment of the invention, the first linewidth is less than or equal to 30 μm.

In one embodiment of the invention, two ends of the opaque bridge line have two first sub borders, two ends of the low reflection pattern layer have two second sub borders, and the first sub borders are substantially aligned to the second sub borders.

In one embodiment of the invention, two ends of the opaque bridge line have two first sub borders, and the low reflection pattern layer exposes the first sub borders of the opaque bridge line.

A manufacturing method of capacitive touch panel of the invention includes the following steps. An opaque bridge material layer is formed on an outer surface of the substrate. A low reflective material layer is formed on the opaque bridge material layer. The low reflective material layer and the opaque bridge material layer are patterned to form at least one low reflection pattern layer and at least one opaque bridge line, wherein the opaque bridge line and the low reflection pattern layer substantially have the same pattern and are aligned and overlapped with each other on a vertical projection direction. An insulating pattern layer is formed on the substrate for covering the low reflection pattern layer and the opaque bridge line. At least a portion of the low reflection pattern layer and of the insulating pattern layer located at two ends of the opaque bridge line is removed.

Next, a transparent conductive layer is formed on the substrate for covering the low reflection pattern layer and the opaque bridge line, and the transparent conductive layer is patterned to form a plurality of first transparent electrodes, a plurality of second transparent electrodes and at least one transparent bridge line, wherein the first transparent electrodes is disposed along a first direction, the opaque bridge line is partially overlapped with the two adjacent first transparent electrodes so that the opaque bridge line is electrodes electrically connected with the two adjacent first transparent. The second transparent electrodes is disposed on the outer surface of the substrate along a second direction, and the transparent bridge line electrically connects the two adjacent second transparent electrodes.

In one embodiment of the invention, the opaque bridge line has a first linewidth, two sides of the opaque bridge line have two first main borders, the low reflection pattern layer has a second linewidth, and two sides of the low reflection pattern layer have two second main borders, wherein the low reflection pattern layer overlaps with the opaque bridge line on the vertical projection direction, the first linewidth is substantially equal to the second linewidth, and the first main borders are substantially aligned to the second main borders.

In one embodiment of the invention, two ends of the opaque bridge line have two first sub borders, two ends of the low reflection pattern layer have two second sub borders, and the first sub borders are substantially aligned to the second sub borders.

In one embodiment of the invention, two ends of the opaque bridge line have two first sub borders, and the low reflection pattern layer exposes the first sub borders of the opaque bridge line In one embodiment of the invention, after the transparent conductive layer is patterned, a planar layer is further formed on the substrate for covering the capacitive touch device.

In view of foregoing, in the capacitive touch display panel, the capacitive touch panel and the manufacturing method thereof of the invention, the low reflection pattern layer is accurately disposed on the opaque bridge line for covering the opaque bridge line. As such, light is irradiated on the low reflection pattern layer rather than on the opaque bridge line, and a display aperture ratio around the opaque bridge line is not lowered, thereby providing the user with favorable visual experience.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DETAILED DESCRIPTION OF DISCLOSED EMBODIMENTS

Figure 1:
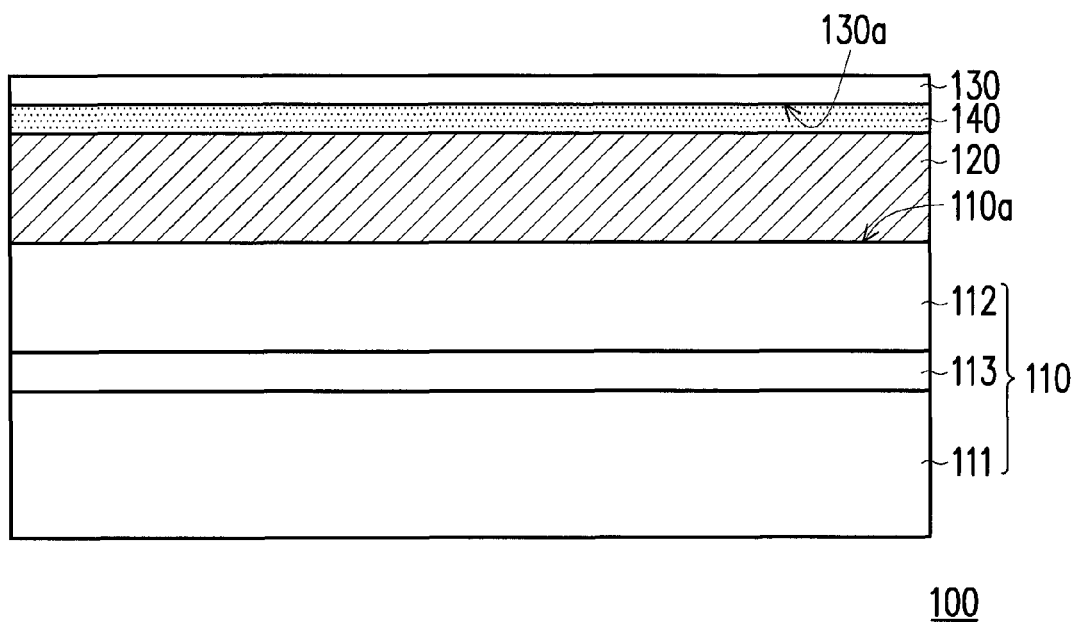
FIG. 1 is a schematic cross-sectional diagram illustrating a capacitive touch display panel according to an embodiment of the invention.

FIG. 1 is a schematic cross-sectional diagram illustrating a capacitive touch display panel according to an embodiment of the invention. Referring to FIG. 1, a capacitive touch display panel 100 includes a display panel 110 and a capacitive touch device 120. The display panel 110 has a display surface 110a, and the capacitive touch device 120 is disposed on the display surface 110a of the display panel 110. For instance, the display panel 110 of the present embodiment includes a pixel array substrate 111, a color filter substrate 112 and a display medium layer 113, wherein the display medium layer 113 is located between the pixel array substrate 111 and the color filter substrate 112. The capacitive touch device 120 is disposed at a side of the color filter substrate 112 that is relatively away from the display medium layer 113. In other words, the capacitive touch display panel 100 of the present embodiment is an on-cell capacitive touch display panel. It is to be explained that, the capacitive touch display panel 100 of the present embodiment integrates the display panel 110 with the capacitive touch device 120, and thus have both display and touch functions. However, in other embodiments, the capacitive touch device 120 may be manufactured on any substrate, such as glass substrate, plastic substrate or flexible substrate, so as to be integrated as one capacitive touch panel.

Figure 2:
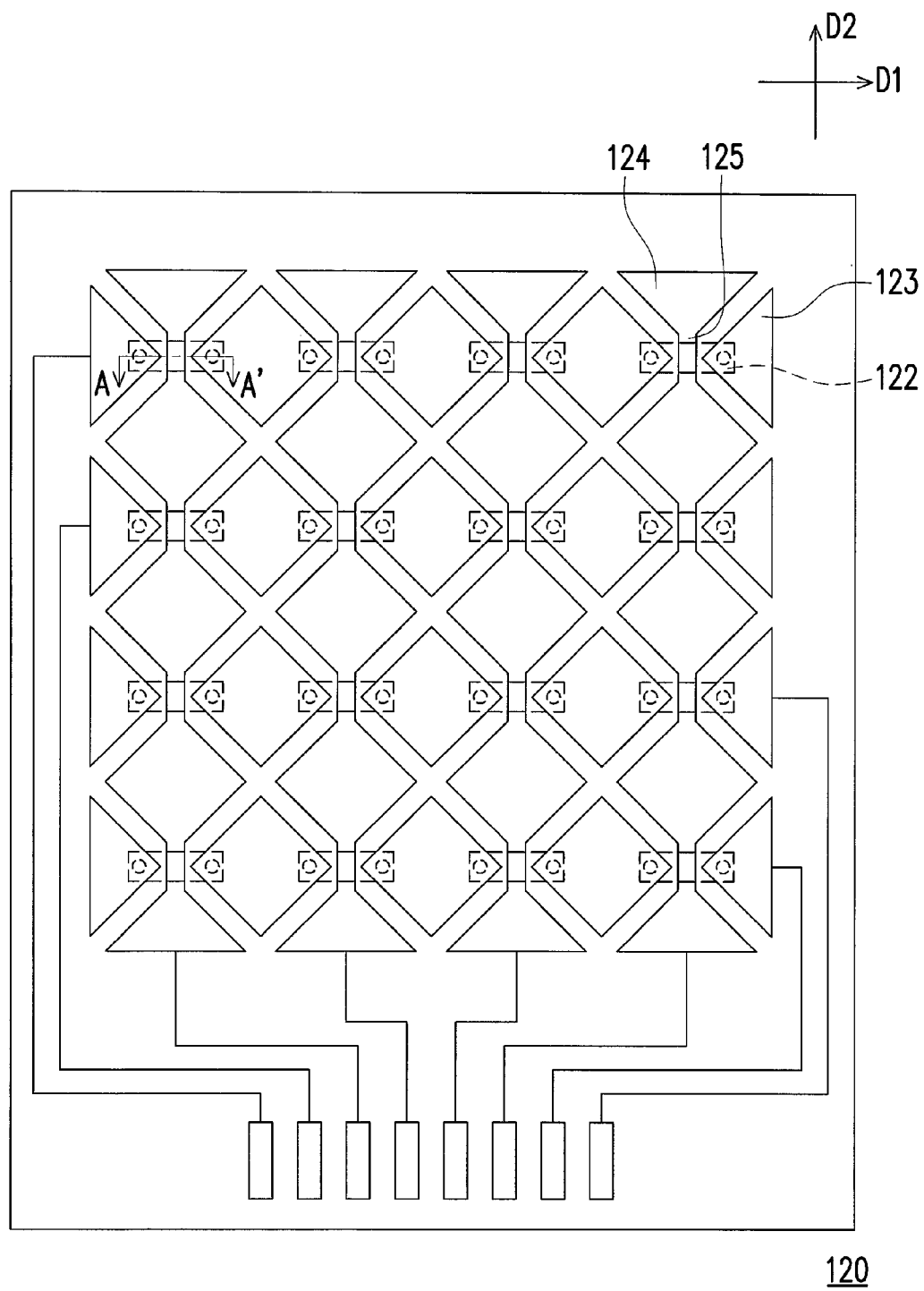
FIG. 2 is a schematic top view of a capacitive touch device in FIG. 1.
Figure 3:
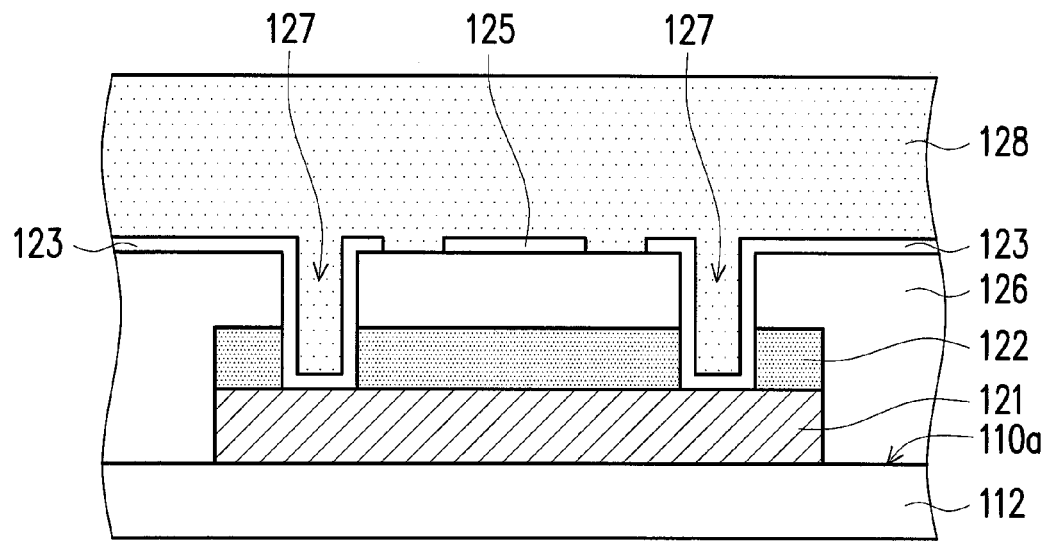
FIG. 3 is a schematic cross-sectional diagram along a line A-A' in FIG. 2.

FIG. 2 is a schematic top view of a capacitive touch device in FIG. 1. FIG. 3 is a schematic cross-sectional diagram along a line A-A' in FIG. 2. Referring to FIG. 2 and FIG. 3 at the same time, the capacitive touch device 120 includes at least one opaque bridge line 121, at least one low reflection pattern layer 122, a plurality of first transparent electrodes 123, a plurality of second transparent electrodes 124, at least one transparent bridge line 125 and an insulating pattern layer 126. The at least one opaque bridge line 121 is disposed on the display surface 110a of the display panel 110, and the at least one low reflection pattern layer 122 is disposed at a side of the opaque bridge line 121 that is opposite to the display panel 110.

The first transparent electrodes 123 are disposed on the display surface 110a of the display panel 110 along a first direction D1, and the opaque bridge line 121 is partially overlapped with the two adjacent first transparent electrodes 123 so that the opaque bridge line 121 is electrically connected with the two adjacent first transparent electrodes 123. The second transparent electrodes 124 are disposed on the display surface 110a of the display panel 110 along a second direction D2. The at least one transparent bridge line 125 is disposed on the display surface 110a of the display panel 110 and enables the two adjacent second transparent electrodes 124 to be electrically connected. The insulating pattern layer 126 is disposed between the opaque bridge line 121 and the transparent bridge line 125 to electrically isolate the opaque bridge line 121 from the transparent bridge line 125. A material of the insulating pattern layer 126, for example, may be silicon nitride (SiNx), silicon oxide (SiOx), silicon oxynitride (SiOxNy), an organic material or other insulating material, and the insulating pattern layer 126 may also be an over coat layer.

Figure 4:
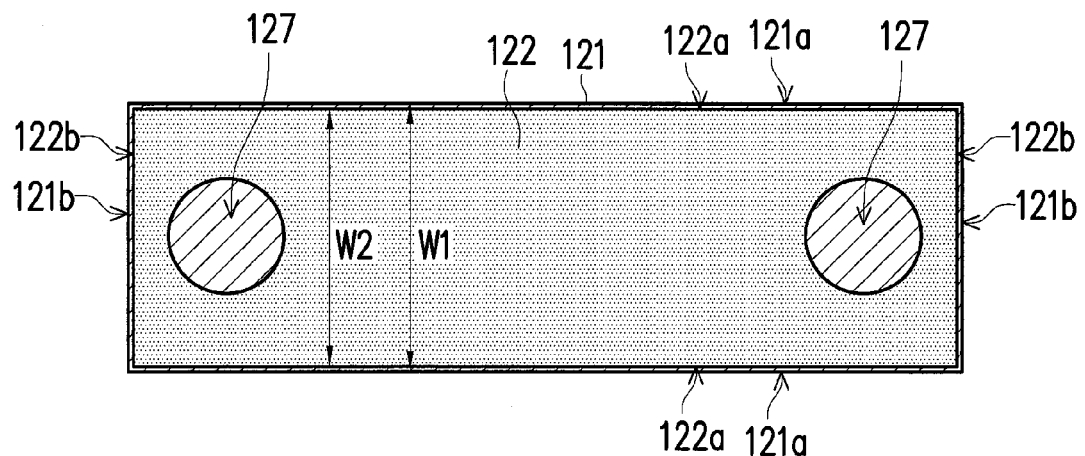
FIG. 4 illustrates an opaque bridge line and a low reflection pattern layer of FIG. 2.

FIG. 4 illustrates an opaque bridge line and a low reflection pattern layer of FIG. 2. As illustrated in FIG. 4, the opaque bridge line 121 has a first linewidth w1, and two sides of the opaque bridge line 121 have two first main borders 121a. The low reflection pattern layer 122 has a second linewidth w2, and two sides of the low reflection pattern layer 122 have two second main borders 122a. The low reflection pattern layer 122 overlaps with the opaque bridge line 121 on a vertical projection direction (e.g., the normal direction of the display surface 110a in FIG. 1). The first linewidth w1 is substantially equal to the second linewidth w2, and the first main borders 121a is substantially aligned to the second main borders 122a. In FIG. 4, for the convenience in labeling and understanding, the first main borders 121a and the second main borders 122a are slightly deviated, but the first main borders 121a and the second main borders 122a may also be exactly aligned.

In the present embodiment, each low reflection pattern layer 122 is correspondingly disposed on one of the opaque bridge lines 121, so that each opaque bridge line 121 is covered by the corresponding low reflection pattern layer 122, and a material of the opaque bridge lines 121, for example, may be molybdenum (Mo), aluminum (Al), chromium (Cr), neodymium (Nd), titanium (Ti), copper (Cu), silver (Ag), gold (Au), zinc (Zn), indium (In), gallium (Ga), niobium (Nb)), or a combination thereof. As such, when the light irradiates on the capacitive touch display panel 100, the low reflection pattern layer 122 would firstly be irradiated to reduce the generation of reflected light, thereby providing the user of the capacitive touch display panel 100 with favorable visual experience. Because the low reflection pattern layer 122 is completely aligned and disposed on the opaque bridge line 121, the low reflection pattern layer 122 may be avoid from having a too large area or an expansion of a shielding area due to process shifting, which leads to a lowering of a display aperture ratio around the opaque bridge line 121.

In the present embodiment, materials of the first transparent electrodes 123, the second transparent electrodes 124 and the transparent bridge line 125 are transparent conductive materials, such as indium tin oxide (ITO), indium zinc tin oxide (ZITO), gallium indium tin oxide (GITO), indium zinc oxide (IZO), gallium zinc oxide (GZO), indium gallium zinc oxide (GIZO), aluminum zinc oxide (AZO), zinc oxide (ZnOx), indium oxide (InOx) or other transparent conductive metal oxides. In addition, a material of the opaque bridge line 121 may be metal, and a material of the low reflection pattern layer 122 may be black resin, low reflective metal, low reflective metal oxide or other low reflective material. The low reflective metal, for example, is chromium metal, and the low reflective metal oxide, for example is chromium metal oxide. When the light irradiated on the capacitive touch display panel 100, the black resin layer may absorb the light to avoid the generation of the reflected light. In addition, the first linewidth w1 of the opaque bridge line 121 of the present embodiment is more favorably being less than or equal to 30 μm. The smaller the first linewidth w1, the smaller the area of the opaque bridge line 121; and therefore, generation of reflected light may better be avoided as the light irradiates on the opaque bridge line 121.

Referring to FIG. 1, in the present embodiment, the capacitive touch display panel 100 further includes a polarizer 130 and an optical adhesive layer 140. The polarizer 130 is disposed on the display surface 110a of the display panel 110 for covering the capacitive touch device 120, and the optical adhesive layer 140 is disposed on a surface 130a of the polarizer 130 that faces toward the display surface 100a, so that the polarizer 130 may be attached on the capacitive touch device 120. The optical adhesive layer 140 has favorable flowability, so air bubbles are less likely to be formed when the polarizer 130 is attached on the capacitive touch device 120, thereby relatively improving the optical characteristics of the capacitive touch display panel 100.

The opaque bridge line 121 of the present embodiment may be electrically connected with the two adjacent first transparent electrodes 123. Referring to FIG. 3 and FIG. 4, in detail, each capacitive touch device 120 includes at least two contact windows 127, and contact window 127 is located at the two ends of the opaque bridge line 121. The contact windows 127 penetrate the insulating pattern layer 126 and the low reflection pattern layer 122 to expose a portion of the opaque bridge line 121. The two adjacent first transparent electrodes 123 respectively extend into the corresponding contact windows 127 to be in contact with the opaque bridge line 121. As such, the two adjacent first transparent electrodes 123 may be electrically connected with each other through the conductive opaque bridge line 121. In the present embodiment, the two ends of the opaque bridge line 121 have two first sub borders 121b, and the two ends of the low reflection pattern layer 122 have two second sub borders 122b. The two contact windows 127 are respectively located beside the first sub borders 121b and within the range of the low reflection pattern layer 122, wherein the first sub borders 121b is substantially aligned to the second sub borders 122b.

It is to be noted that the following embodiment has adopted component notations and part of the contents from the previous embodiment, wherein the same notations are used for representing the same or similar components, and descriptions of the same technical contents are omitted. The descriptions regarding to the omitted part may be referred to the previous embodiment, and thus is not repeated herein.

Figure 5:
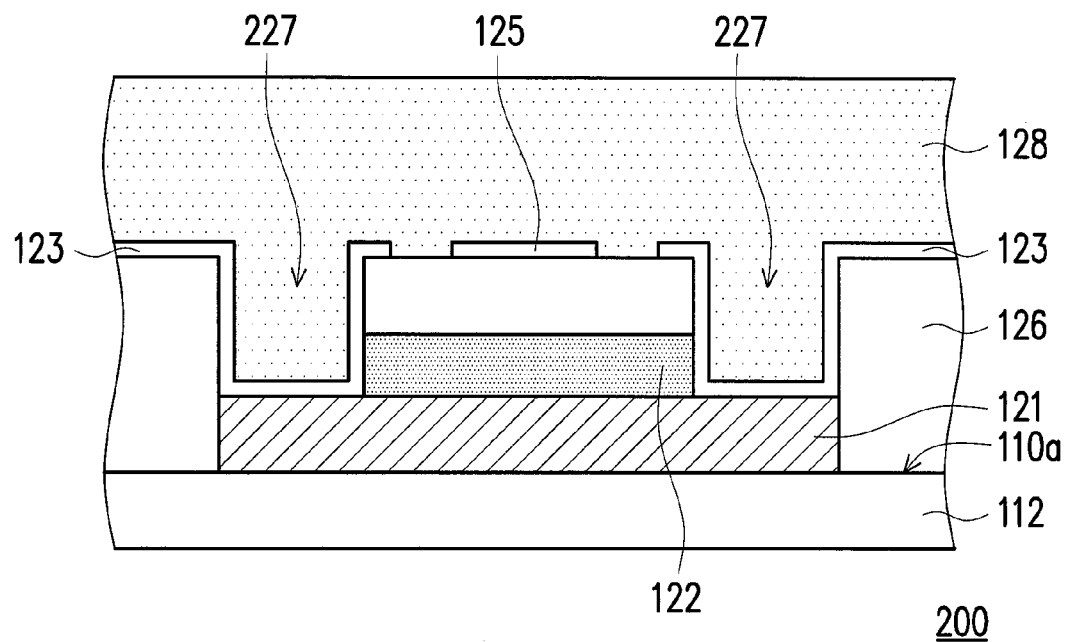
FIG. 5 is a partial schematic cross-sectional diagram illustrating a capacitive touch display panel according to another embodiment of the invention.
Figure 6:
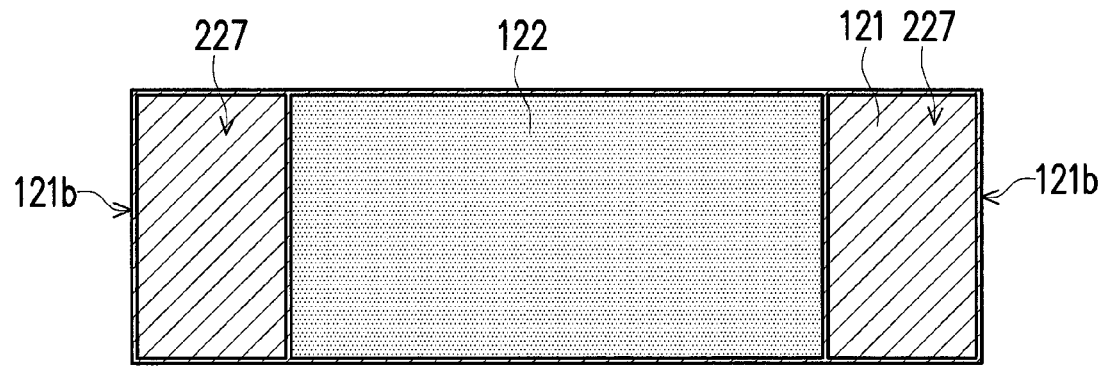
FIG. 6 illustrates an opaque bridge line and a low reflection pattern layer of FIG. 5.

FIG. 5 is a partial schematic cross-sectional diagram illustrating a capacitive touch display panel according to another embodiment of the invention. FIG. 6 illustrates an opaque bridge line and a low reflection pattern layer of FIG. 5. The embodiment of FIG. 5 is similar to the embodiment of FIG. 1, a main difference between the two lies in the form of the contact window. Referring to FIG. 5 and FIG. 6 at the same time, in the present embodiment, the low reflection pattern layer 122 overlaps with the opaque bridge line 121 on a vertical projection direction (e.g., the normal direction of display surface 110a of FIG. 5). In addition, the area of the low reflection pattern layer 122 is smaller than the area of the opaque bridge line 121, and the outer contour of the low reflection pattern layer 122 is located within the outer contour of the opaque bridge line 121. As such, the low reflection pattern layer 122 exposes the first sub borders 121b of the opaque bridge line 121, and the first sub borders 121b form sidewalls of contact window 227.

Figure 7:
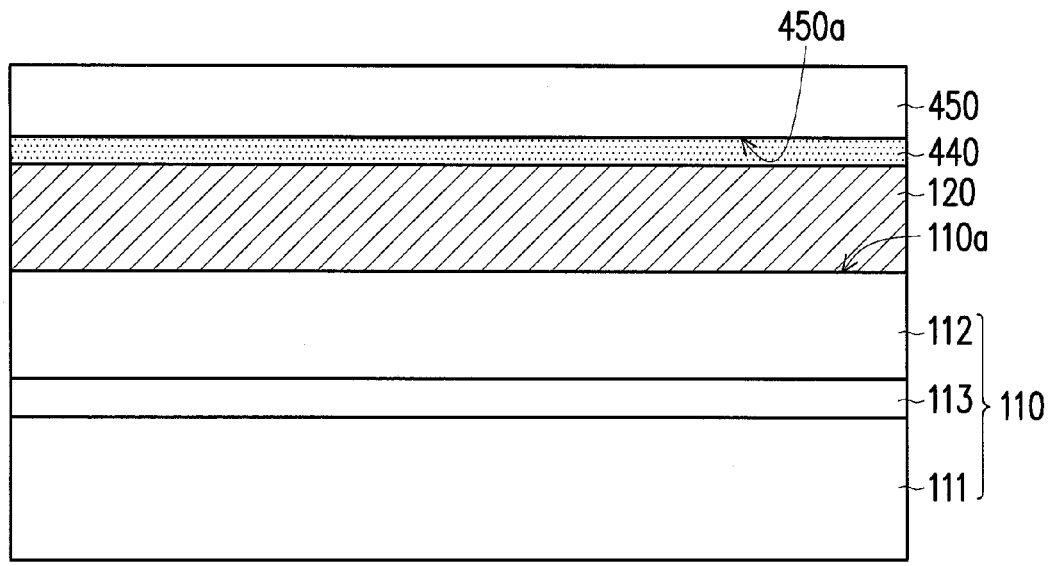
FIG. 7 is a schematic cross-sectional diagram illustrating a capacitive touch display panel according to another embodiment of the invention.

FIG. 7 is a schematic cross-sectional diagram illustrating a capacitive touch display panel according to another embodiment of the invention. In the present embodiment, a capacitive touch display panel 400 further includes a protective plate 450. The protective plate 450 is disposed on the display surface 110a of the display panel 110 for covering the capacitive touch device 120. The protective plate 450 is located at an outermost side of the capacitive touch display panel 400, and can protect the internal components of the capacitive touch display panel 400. In addition, the capacitive touch display panel 400 further includes an optical adhesive layer 440. The optical adhesive layer 440 is disposed on a surface 450a of the protective plate 450 that faces toward the display surface 110a, so as to attach the protective plate 450 on the capacitive touch device 120.

Figure 8:
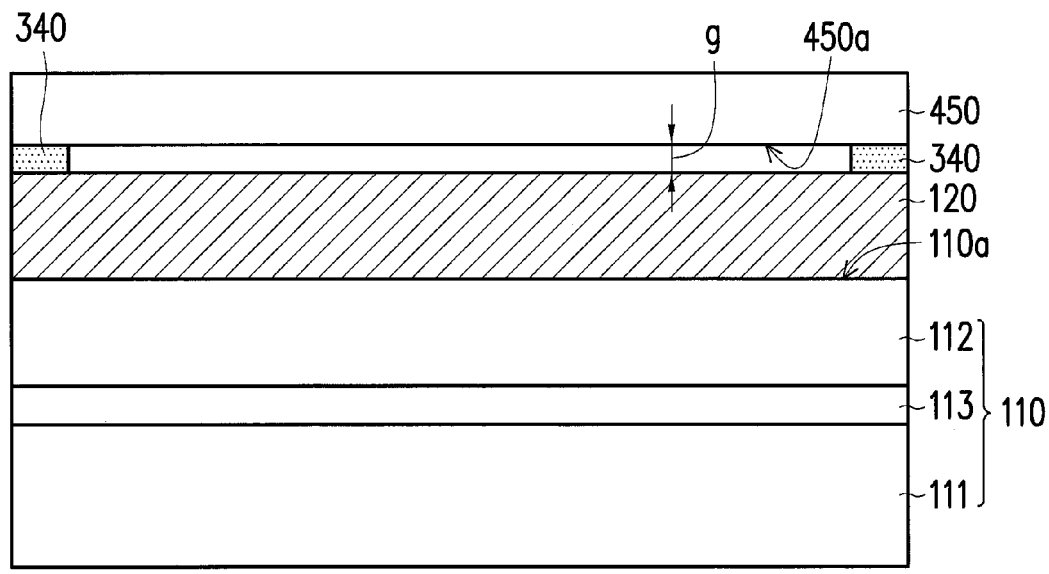
FIG. 8 is a schematic cross-sectional diagram illustrating a capacitive touch display panel according to another embodiment of the invention.

FIG. 8 is a schematic cross-sectional diagram illustrating a capacitive touch display panel according to another embodiment of the invention. The embodiment of FIG. 8 is similar to the embodiment of FIG. 7, and a main difference between the two lies in coating range of optical adhesive layer. In the embodiment of FIG. 7, the optical adhesive layer 140 is coated or attached on the entire surface 450a of the protective plate 450, and may be referred to as direct bonding or full lamination. However, in the present embodiment, an optical adhesive layer 340 is coated around the surface 450a. As illustrated in the cross-sectional diagram of FIG. 8, there is a gap g between the protective plate 450, the optical adhesive layer 340 and the capacitive touch device 120, and this may be referred to as air bonding or edge lamination. The coating range of the optical adhesive layer 340 of the present embodiment is relatively small and has the advantage of saving production costs. It is to be explained that, the embodiment of FIG. 8 has taken the optical adhesive layer 440 being coated around the surface 450a of the protective plate 450 as an example for illustration, but in the other embodiments, the optical adhesive layer 140 may also be coated around the surface 130a of the polarizer 130, wherein this part of description may be referred back to the embodiment of FIG. 1, and thus is not repeated herein.

Figure 9:
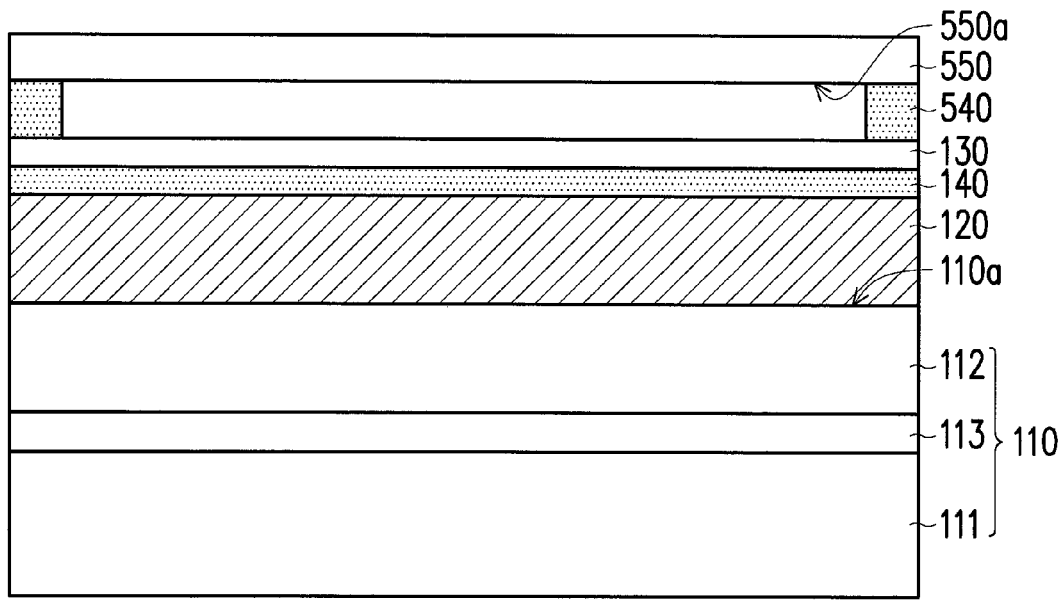
FIG. 9 is a schematic cross-sectional diagram illustrating a capacitive touch display panel according to another embodiment of the invention.
Figure 10:
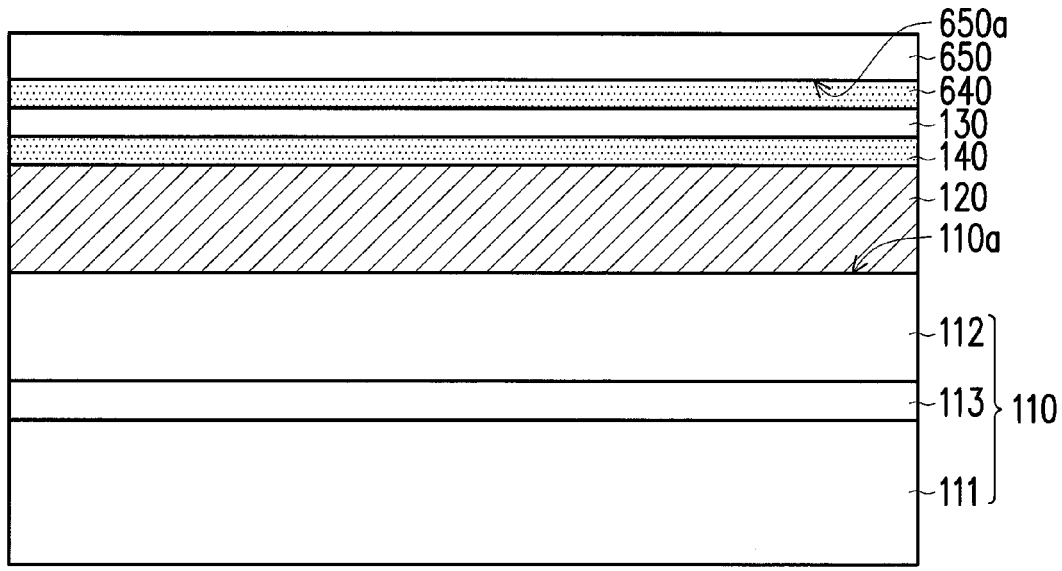
FIG. 10 is a schematic cross-sectional diagram illustrating a capacitive touch display panel according to another embodiment of the invention.

FIG. 9 is a schematic cross-sectional diagram illustrating a capacitive touch display panel according to another embodiment of the invention. The embodiment of FIG. 9 is similar to the embodiment of FIG. 1, and a main difference between the two lies in that, in the embodiment of FIG. 9, a capacitive touch display panel 500 further includes another optical adhesive layer 540 and a protective plate 550. In other words, the capacitive touch display panel 500 of the present embodiment concurrently includes the polarizer 130 and the protective plate 550. The protective plate 550 is located at an outermost side of the capacitive touch display panel 500 for protecting the internal components. In the present embodiment, the optical adhesive layer 540 is disposed on a surface 550a of the protective plate 550 that faces toward the display surface 110a, and is coated around the surface 550a. FIG. 10 is a schematic cross-sectional diagram illustrating a capacitive touch display panel according to another embodiment of the invention. The embodiment of FIG. 10 is similar to the embodiment of FIG. 9, and a main difference between the two lies in that, in the embodiment of FIG. 10, an optical adhesive layer 640 is completely coated on a surface 650a of the protective plate 650 that faces toward the display surface 110a.

The advantage of saving production costs may be attained by coating the optical adhesive layer around the protective plate or the polarizer. On the other hand, by coating the optical adhesive layer completely on the surface of the entire protective plate or the polarizer, the protective plate or the polarizer may be more stably attached to the capacitive touch device. In practical applications, the coating or attachment range of the optical adhesive layer may be adjusted according to the design of the capacitive touch display panel, and thus the capacitive touch display panel may have more favorable design flexibility.

Figure 11A:
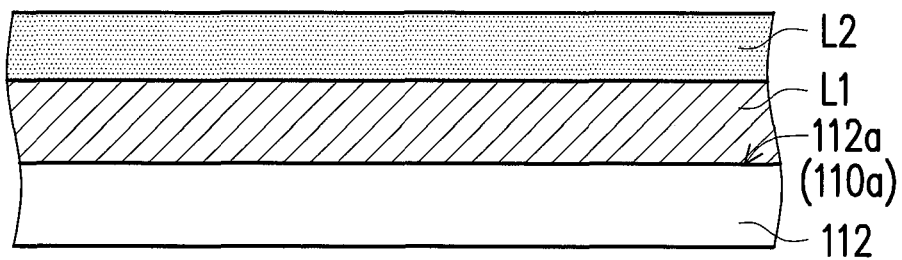
FIG. 11A to FIG. 11F are manufacturing flow diagrams of the capacitive touch display panel of FIG. 1.

Each of the components and the embodiments of the capacitive touch display panel are described as above, and the following below is directed to the manufacturing process of the capacitive touch display panel. FIG. 11A to FIG. 11F are manufacturing flow diagrams of the capacitive touch display panel of FIG. 1. Referring to FIG. 11A, an opaque bridge material layer L1 is formed on the outer surface 112a of the color filter substrate 112, and a low reflective material layer L2 is formed on the opaque bridge material layer L1. In the present embodiment, the outer surface 112a is the display surface 110a of FIG. 1. The color filter substrate 112 of the present embodiment may replaced with any substrate, such as glass substrate, plastic substrate or flexible substrate, for manufacturing a capacitive touch panel, wherein this part of descriptions may be referred back to the embodiment of FIG. 1, and thus is not repeated herein.

Figure 11B:
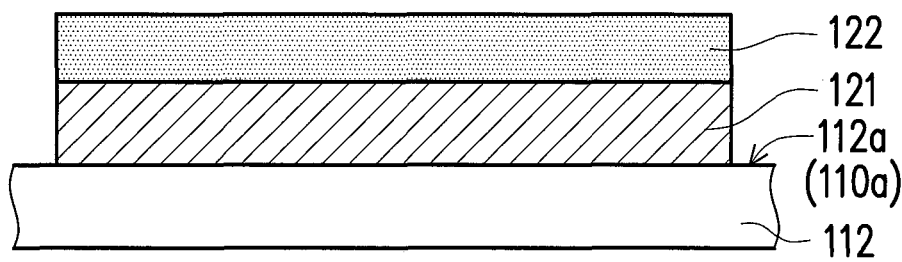

Next, as illustrated in FIG. 11B, the low reflective material layer L2 and the opaque bridge material layer L1 are patterned to form the at least one low reflection pattern layer 122 and the at least one opaque bridge line 121, wherein the opaque bridge line 121 and the low reflection pattern layer 122 substantially have the same pattern, and are aligned and overlapped with each other on a vertical projection direction (e.g., the normal direction of the display surface 110a). Since the opaque bridge line 121 and the low reflection pattern layer 122 are patterned in the same step, the patterns thereof are the same, so that the first main borders 121a of FIG. 4 are substantially aligned to the second main borders 122a. It is to be explained that, in the step of FIG. 11B, the low reflective material layer L2 may firstly be patterned, and the low reflection pattern layer 122 formed by the patterned low reflective material layer L2 may be used as an etching mask for patterning the opaque bridge material layer L1. Or, a patterned photoresist layer (not shown) may firstly be formed on the low reflective material layer L2 and the opaque bridge material layer L1, and then the patterned photoresist layer may be used as the etching mask for sequentially etching the low reflective material layer L2 and the opaque bridge material layer L1 to form the required low reflection pattern layer 122 and opaque bridge line 121.

Figure 11C:
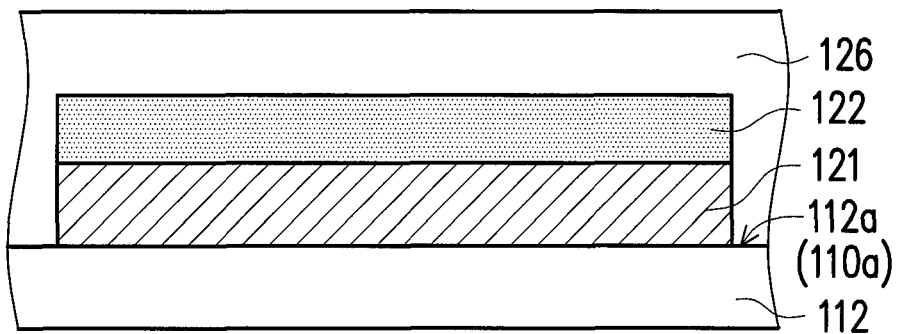
Figure 11D:
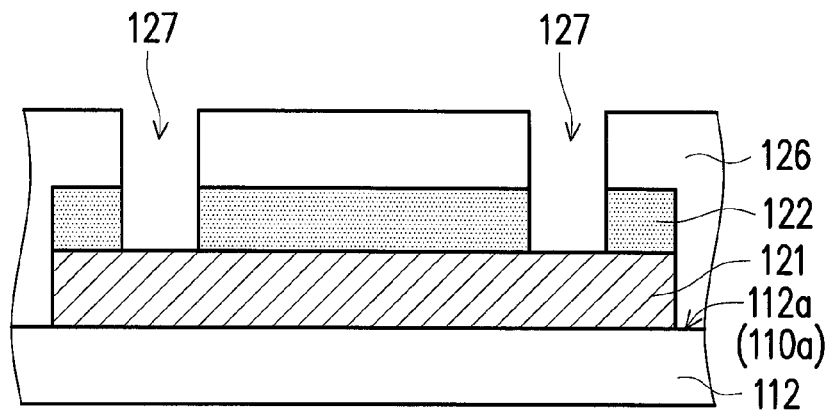

Referring to FIG. 11C, subsequently, the insulating pattern layer 126 is formed on the color filter substrate 112 for covering the low reflection pattern layer 122 and the opaque bridge line 121. The insulating pattern layer 126 may electrically isolate the low reflection pattern layer 122 from the opaque bridge line 121 at other conductive layer. Then, as illustrated in FIG. 11D, at least a portion of the low reflection pattern layer 122 and of the insulating pattern layer 126 located at the two ends of the opaque bridge line 121 is removed. In this step, the portions of the low reflection pattern layer 122 and of the insulating pattern layer 126 form at least two contact windows 127. It is to be explained that, when the range of removal is relative large and exceeds the original outer contour of the low reflection pattern layer 122, the portions being removed form the contact windows 227, as shown in FIG. 5.

Figure 11E:
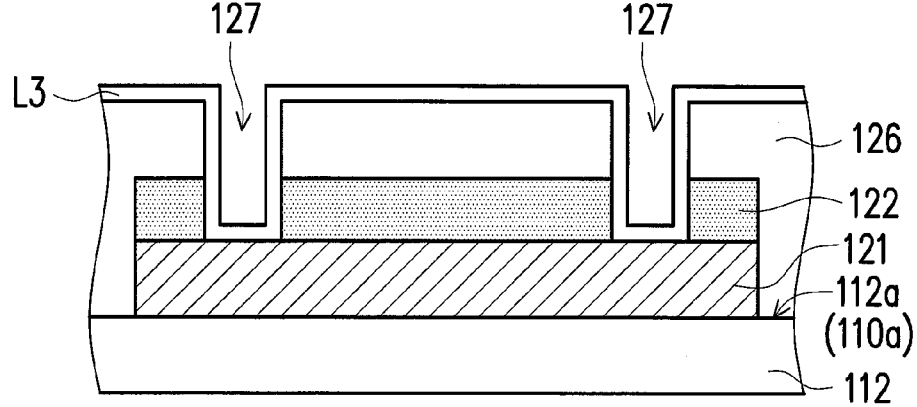
Figure 11F:
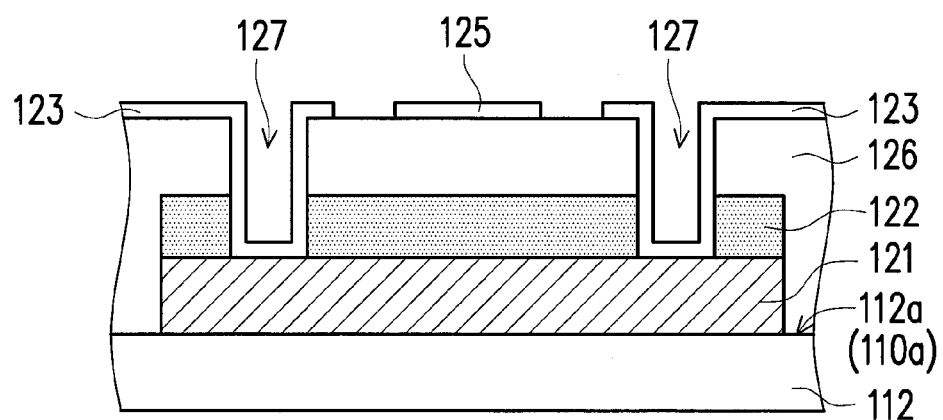

Referring to FIG. 11E, after the contact windows 127 are formed, a transparent conductive layer L3 is formed on the color filter substrate 112 for covering the low reflection pattern layer 122 and the opaque bridge line 121. In this step, a portion of the transparent conductive layer L3 extends into the corresponding contact window 127 to be in contact with the opaque bridge line 121. Next, referring to FIG. 2 and FIG. 11F at the same time, in the step shown in FIG. 11F, the transparent conductive layer L3 is patterned. The patterned transparent conductive layer L3 forms the first transparent electrodes 123, the second transparent electrodes 124 and the at least one transparent bridge line 125, as shown in FIG. 2 and FIG. 11F. Wherein, the first transparent electrodes 123 is disposed along the first direction D1, and the opaque bridge line 121 is partially overlapped with the two adjacent first transparent electrodes 123 so that the opaque bridge line 121 is electrically connected with the two adjacent first transparent electrodes 123. The second transparent electrodes 124 is disposed on the outer surface 112a of the color filter substrate 112 along the second direction D2, and the transparent bridge line 125 enables the two adjacent second transparent electrodes 124 to be electrically connected.

Referring to FIG. 3, after the transparent conductive layer L3 is patterned, a planar layer 128 may further be formed on the color filter substrate) 12 for covering the capacitive touch device 120. The planar layer 128 may block water vapor from entering the capacitive touch device 120, thereby avoiding the capacitive touch device 120 from being damaged by moisture. After the steps shown in FIG. 11A to FIG. 11F and FIG. 3, the capacitive touch display panel of FIG. 1 may be manufactured.

It is to be noted that the following embodiment has adopted component notations and part of the contents from the previous embodiments, wherein the same notations are used for representing the same or similar components, and descriptions of the same technical contents are omitted. The descriptions regarding to the omitted part may be referred to the previous embodiments, and thus is not repeated herein.

Figure 12:
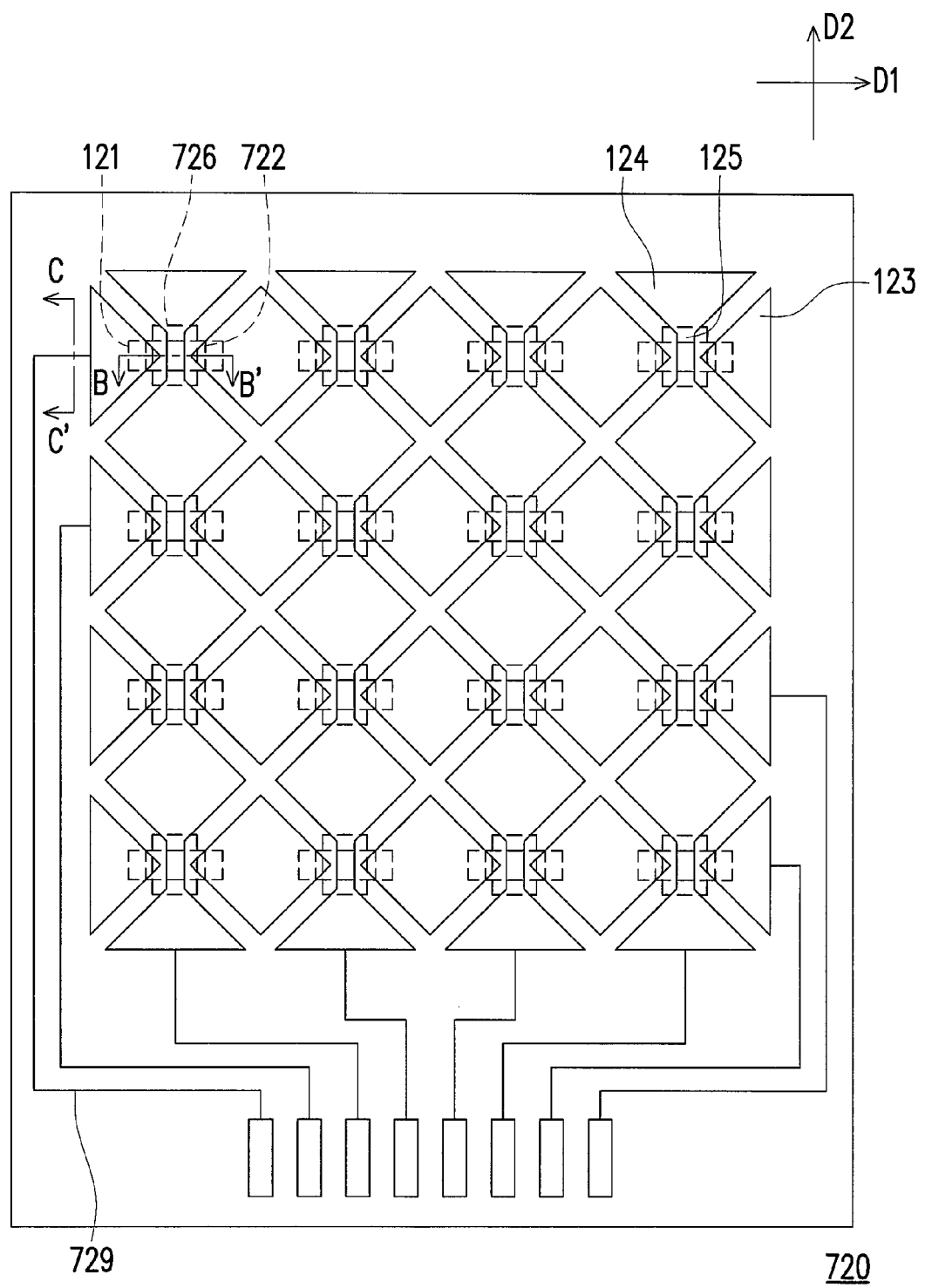
FIG. 12 is a schematic top view illustrating a capacitive touch display panel according to another embodiment of the invention.
Figure 13:
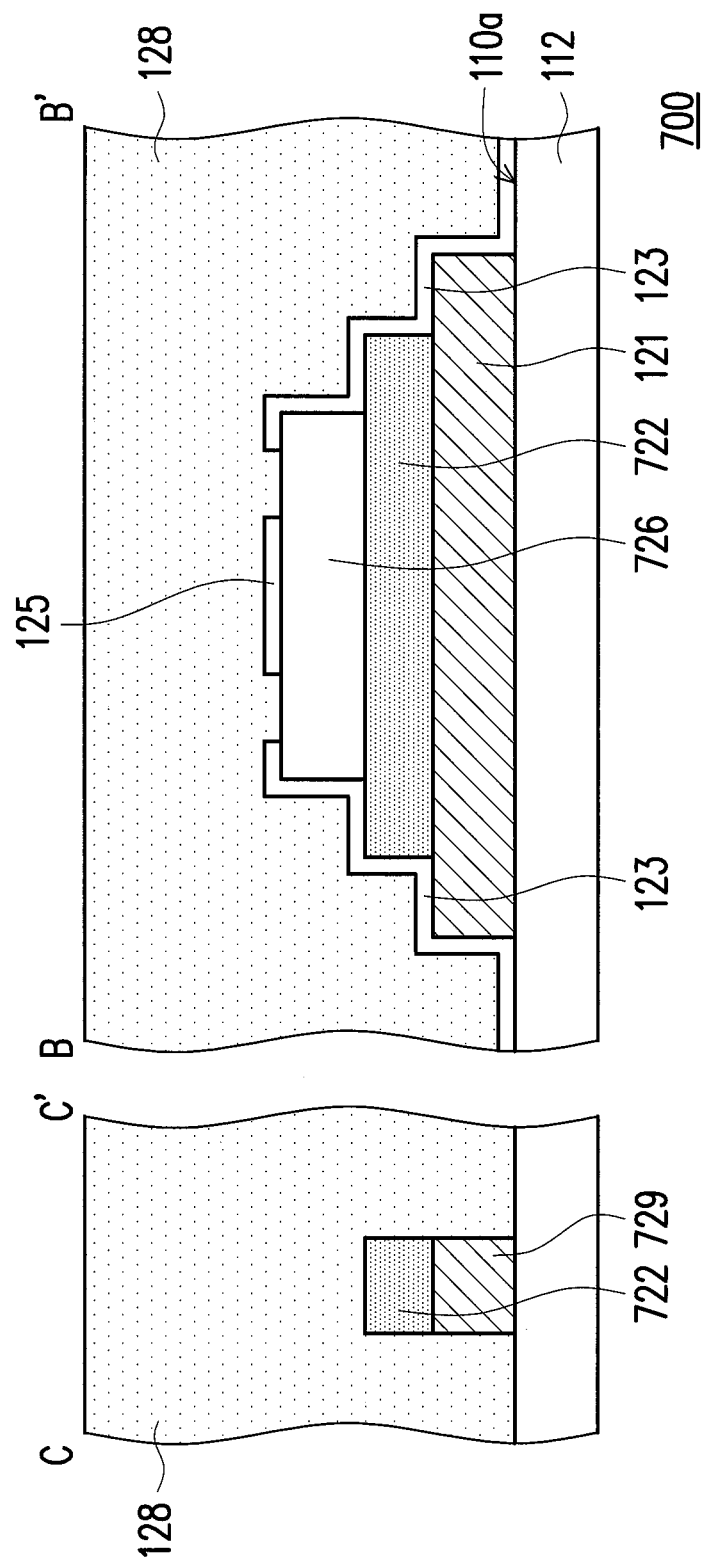
FIG. 13 is a schematic cross-sectional diagram along a line B-B' and a line C-C' in FIG. 12.

FIG. 12 is a schematic top view illustrating a capacitive touch display panel according to another embodiment of the invention. FIG. 13 is a schematic cross-sectional diagram along a line B-B' and a line C-C' in FIG. 12. Referring to FIG. 12 and FIG. 13 at the same time, the embodiment of FIG. 12 is similar to the embodiment of FIG. 5, and a main difference between the two lies in the cover range of the insulating pattern layer. Specifically, in the embodiment of FIG. 5, other than the contact windows 227, the insulating pattern layer 126 completely covers the low reflection pattern layer 122, the opaque bridge line 121 and the color filter substrate 112. In the present embodiment, the insulating pattern layer 726 merely covers parts of the opaque bridge line 121 and parts of the low reflection pattern layer 722, and exposes the two ends of the opaque bridge line 121. And, the two adjacent first transparent electrodes 123 cover the two ends of the opaque bridge line 121 that are exposed by the insulating pattern layer 726, so as to be electrically connected.

Moreover, in the present embodiment, a capacitive touch display panel 700 further includes a plurality connecting lines 729 to transmit a signal of the capacitive touch device 720. Both materials of the connecting lines 729 and of the opaque bridge line 121 are, for example, metal. As illustrated in the cross-sectional diagram of FIG. 13, the low reflection pattern layer 722 of the present embodiment, in addition to covering the opaque bridge line 121, further covers the connecting lines 729. As such, the low reflection pattern layer 722 covers the components in the capacitive touch display panel 700 that are most likely to reflect ambient light, so as to provide the user of the capacitive touch display panel 700 with favorable visual experience.

In summary, in the capacitive touch display panel, the capacitive touch panel and the manufacturing method thereof the invention, since the opaque bridge line may be accurately be aligned and covered by the low reflection pattern layer, the display aperture ratio around the opaque bridge line would not be lowered due to the area of the low reflection pattern layer being too large or relative process shifting in the low reflection pattern layer, and may improve the problem in which the conventional opaque bridge line is easily being seen by user as it reflects the ambient light, thereby further providing the users of the capacitive touch display panel and the capacitive touch panel with favorable visual experience.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A capacitive touch display panel comprising:
   a display panel having a display surface; and
   a capacitive touch device disposed on the display surface of the display panel, wherein the capacitive touch device comprising:
      at least one opaque bridge line disposed on the display surface of the display panel, the opaque bridge line having a first linewidth, and the opaque bridge line having two first main borders at two sides;
      at least one low reflection pattern layer disposed on the opaque bridge line and located opposite to the display panel, the low reflection pattern layer having a second linewidth, the low reflection pattern layer having two second main borders at two sides, wherein the low reflection pattern layer overlaps with the opaque bridge line on a vertical projection direction, the first linewidth is substantially equal to the second linewidth, and the first main borders is substantially aligned to the second main borders;
      a plurality of first transparent electrodes disposed on the display surface of the display panel along a first direction, and the opaque bridge line being partially overlapped with the two adjacent first transparent electrodes and the opaque bridge line being electrically connected with the two adjacent first transparent electrodes;
      a plurality of second transparent electrodes disposed on the display surface of the display panel along a second direction;
      at least one transparent bridge line disposed on the display surface of the display panel and the at least one transparent bridge line being electrically connected to the two adjacent second transparent electrodes; and
      an insulating pattern layer disposed between the opaque bridge line and the transparent bridge line to electrically isolate the opaque bridge line from the transparent bridge line, wherein the low reflection pattern layer is disposed between the insulating pattern layer and the opaque bridge line.

2. The capacitive touch display panel as recited in claim 1, further comprising a polarizer disposed on the display surface of the display panel and covering the capacitive touch device.

3. The capacitive touch display panel as recited in claim 1, further comprising a protective plate disposed on the display surface of the display panel and covering the capacitive touch device.

4. The capacitive touch display panel as recited in claim 1, wherein the low reflection pattern layer includes a black resin layer, a low reflective metal layer or a low reflective metal oxide layer.

5. The capacitive touch display panel as recited in claim 1, wherein two ends of the opaque bridge line have two first sub borders, two ends of the low reflection pattern layer have two second sub borders, and the first sub borders are substantially aligned to the second sub borders.

6. The capacitive touch display panel as recited in claim 1, wherein two ends of the opaque bridge line have two first sub borders, and the low reflection pattern layer exposes the first sub borders of the opaque bridge line.

7. The capacitive touch display panel as recited in claim 1, wherein the low reflection pattern layer comprises a plurality of contact windows, and the first transparent electrodes are electrically connected to the opaque bridge line through the contact windows.

8. The capacitive touch display panel as recited in claim 1, wherein the low reflection pattern layer is directly in contact with the opaque bridge line.

9. A capacitive touch panel, comprising:
   a substrate having an outer surface; and
   a capacitive touch device disposed on the outer surface of the substrate, the capacitive touch device comprising:
      at least one opaque bridge line disposed on the outer surface of the substrate, the opaque bridge line having a first linewidth, and the opaque bridge line having two first main borders at two sides;
      at least one low reflection pattern layer disposed on the opaque bridge line and located opposite to the substrate, the low reflection pattern layer having a second linewidth, and the low reflection pattern layer having two second main borders at two sides, wherein the low reflection pattern layer overlaps with the opaque bridge line on a vertical projection direction, the first linewidth is substantially equal to the second linewidth, and the first main borders is substantially aligned to the second main borders;
      a plurality of first transparent electrodes disposed on the outer surface of the substrate along a first direction, and the opaque bridge line being partially overlapped with the two adjacent first transparent electrodes so that the opaque bridge line is electrically connected with the two adjacent first transparent electrodes;
      a plurality of second transparent electrodes disposed on the outer surface of the substrate along a second direction;
      at least one transparent bridge line disposed on the outer surface of the substrate and electrically connecting the two adjacent second transparent electrodes; and
      an insulating pattern layer disposed between the opaque bridge line and the transparent bridge line to electrically isolate the opaque bridge line from the transparent bridge line, wherein the low reflection pattern layer is disposed between the insulating pattern layer and the opaque bridge line.

10. The capacitive touch panel as recited in claim 9, wherein two ends of the opaque bridge line have two first sub borders, two ends of the low reflection pattern layer have two second sub borders, and the first sub borders are substantially aligned to the second sub borders.

11. The capacitive touch panel as recited in claim 9, wherein two ends of the opaque bridge line have two first sub borders, and the low reflection pattern layer exposes the first sub borders of the opaque bridge line.

12. A manufacturing method of capacitive touch panel, comprising:
   forming an opaque bridge material layer on an outer surface of a substrate;

forming a low reflective material layer on the opaque bridge material layer and opposite to the outer surface of the substrate;

patterning the low reflective material layer and the opaque bridge material layer to form at least one low reflection pattern layer and at least one opaque bridge line, wherein the opaque bridge line and the low reflection pattern layer substantially have the same pattern and are aligned and overlapped on a vertical projection direction;

forming an insulating pattern layer on the substrate for covering the low reflection pattern layer and the opaque bridge line, wherein the low reflection pattern layer is disposed between the insulating pattern layer and the opaque bridge line;

removing at least a portion of the low reflection pattern layer and of the insulating pattern layer that are located at two ends of the opaque bridge line; and forming a transparent conductive layer on the substrate for covering the low reflection pattern layer and the opaque bridge line, and patterning the transparent conductive layer to form a plurality of first transparent electrodes, a plurality of second transparent electrodes and at least one transparent bridge line, wherein the first transparent electrodes is disposed along a first direction, the opaque bridge line is partially overlapped with the two adjacent first transparent electrodes so that the opaque bridge line is electrically connected with the two adjacent first transparent electrodes, the second transparent electrodes is disposed on the outer surface of the substrate along a second direction, and the transparent bridge line electrically connects the two adjacent second transparent electrodes.

13. The manufacturing method of capacitive touch panel as recited in claim 12, wherein the opaque bridge line has a first linewidth, two sides of the opaque bridge line have two first main borders, the low reflection pattern layer has a second linewidth, and two sides of the low reflection pattern layer have two second main borders, the low reflection pattern layer overlaps with the opaque bridge line on the vertical projection direction, the first linewidth is substantially equal to the second linewidth, and the first main borders are substantially aligned to the second main borders.

14. The manufacturing method of capacitive touch panel as recited in claim 12, wherein two ends of the opaque bridge line have two first sub borders, two ends of the low reflection pattern layer have two second sub borders, and the first sub borders are substantially aligned to the second sub borders.

15. The manufacturing method of capacitive touch panel as recited in claim 12, wherein two ends of the opaque bridge line have two first sub borders, and the low reflection pattern layer exposes the first sub borders of the opaque bridge line.

16. The manufacturing method of capacitive touch panel as recited in claim 12, further comprising forming a planar layer on the substrate for covering the capacitive touch device after patterning the transparent conductive layer.

17. The manufacturing method of capacitive touch panel as recited in claim 12, wherein in the step of patterning the low reflective material layer and the opaque bridge material layer, the low reflection pattern layer is used as an etching mask for patterning the opaque bridge material layer to form the opaque bridge line.

18. The manufacturing method of capacitive touch panel as recited in claim 12, wherein the low reflection pattern layer is directly in contact with the opaque bridge line.

19. The manufacturing method of capacitive touch panel as recited in claim 12, wherein the step of patterning the low reflective material layer and the opaque bridge material layer comprises:

patterning the low reflective material layer first to form the low reflection pattern layer;

patterning the opaque bridge material layer by using the low reflection pattern layer as an etching mask to form the opaque bridge line.

20. The manufacturing method of capacitive touch panel as recited in claim 12, wherein the step of patterning the low reflective material layer and the opaque bridge material layer comprises:

forming a patterned photoresist layer on the low reflective material layer and the opaque bridge material layer;

sequentially patterning the low reflective material layer and the opaque bridge material layer by using the patterned photoresist layer as an etching mask to form the low reflection pattern layer and the opaque bridge line.

* * * * *